United States Patent Office 3,178,426
Patented Apr. 13, 1965

3,178,426
1,3,4-DIOXAZOLYL-CEPHALOSPORIN DERIVATIVES
Josef Fried and Eugene F. Galantay, Princeton, N.J., assignors to Olin Mathieson Chemical Corporation, New York, N.Y., a corporation of Virginia
No Drawing. Filed Oct. 29, 1962, Ser. No. 233,878
7 Claims. (Cl. 260—243)

This invention relates to new derivatives of 7-aminocephalosporanic acid and more particularly to new compounds of the general Formula I:

(I)
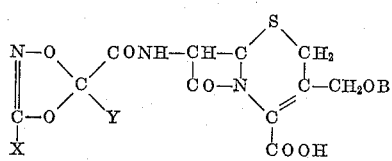

and non-toxic salts thereof; wherein B is hydrogen or acyl, X is carbocyclic aryl or heterocyclic, and Y is lower alkyl or aralkyl. Particularly preferred are those compounds of Formula I wherein B is hydrogen or the acyl radical of a hydrocarbon carboxylic acid of less than twelve carbon atoms, as exemplified by the lower alkanoic acids (e.g., acetic, propionic, butyric, valeric and caproic acid), the lower alkenoic acids (e.g., 2-butenoic acid), the cycloalkanecarboxylic acids, the cycloalkenecarboxylic acids, the monocyclic ar(lower alkanoic acids) (e.g., phenylacetic and β-phenylpropionic acid), and the monocyclic aryl carboxylic acids (e.g., benzoic and p-toluic acid); X is phenyl; a halo (e.g., p-chloro), nitro, hydroxy, amino, trifluoromethyl, lower alkyl (e.g., p-methyl and o-ethyl), lower alkoxy (e.g., p-methoxy and o,p-diethoxy), or a lower alkanoylamido (e.g., p-acetamido) substituted phenyl; naphthyl; a halo, nitro, hydroxy, amino, trifluoromethyl, lower alkyl, lower alkoxy or a lower alkanoylamido substituted naphthyl; or a heterocyclic radical, such as a furyl, thienyl, pyridyl, or piperidyl radical; and Y is lower alkyl or a monocyclic ar(lower alkyl) radical, such as benzyl, phenethyl, and β-phenylhexyl.

Among the suitable salts may be mentioned the alkali metal salts (e.g., sodium and potassium), the alkaline earth metal salts (e.g., magnesium), and amine salts, such as tertiary amine salts, as exemplified by the tri(lower alkyl) amines (e.g., triethylamine and trimethylamine) and by heterocyclic amines (e.g., N-methylpiperidine or N-methylmorpholine).

The compounds of this invention (the compounds of Formula I and their non-toxic salts) are physiologically active substances which have a high degree of antibacterial activity against a large number of microorganisms, including Gram positive and Gram negative microorganisms such as *Staphylococcus aureus, Escherichia coli, Klebsiella pneumoniae, Aerobacter aerogenes,* and *Shigella sonnei*. Particularly valuable activity was observed against resistant (penicillinase-producing) strains of *S. aureus*. In addition the compounds of this invention show a particularly pronounced resistance to acids.

The compounds of this invention, wherein B is acetyl, are prepared by interacting 7-aminocephalosporanic acid with a compound of the general Formula II:

(II)
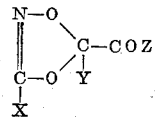

wherein X and Y are as hereinbefore defined, and Z is a halide (preferably chloride), azide, alkoxycarbonyloxy (preferably lower alkoxycarbonyloxy), imidazolyl or op-timally p-nitrophenoxy. The reaction is preferably conducted in the presence of a base, such as one of the bases listed hereinbefore, in an organic solvent for the reactants. The reaction results in the preparation of compounds of Formula I, wherein B is acetyl, in the form of their salts with the base employed in the reaction.

Compounds II, when new, can be prepared by methods well known in the art from the corresponding lower alkyl esters (Z is lower alkoxy), which in turn are prepared by the method of Huisgen et al., Tetrahedron Letters, 1961, p. 583. Thus, the ester can be treated with a base, such as potassium hydroxide, to yield the corresponding free acid (Z is hydroxy), and the resulting acid treated with oxalyl chloride in the presence of pyridine to yield the corresponding acyl chloride (Z is chlorine) or with an alkoxycarbonyl chloride (e.g. ethoxycarbonyl chloride) in the presence of pyridine to yield the corresponding anhydride (Z is alkoxycarbonyloxy), or with carbonyl diimidazole to yield the corresponding imidazolyl (Z is imidazolyl), or with p-nitrophenol in the presence of dicyclohexyl carbodiimide to yield the corresponding p-nitrophenyl ester (Z is p-nitrophenoxy).

Among the suitable reactants can be mentioned the lower alkyl (e.g., ethyl) esters of 2-(lower alkyl-5-phenyl-1,3,4-dioxazole-2-carboxylic acids, such as 2-methyl-5-phenyl-1,3,4-dioxazole-2-carboxylic acid, 2-ethyl-5-phenyl-1,3,4-dioxazole-2-carboxylic acid, 2-isopropyl-5-phenyl-1,3,4-dioxazole-2-carboxylic acid and 2-n-hexyl-5-phenyl-1,3,4-dioxazole-2-carboxylic acid; 2-[monocyclic ar(lower akyl)]-5-phenyl-1,3,4-dioxazole-2-carboxylic acids, such as 2-benzyl-5-phenyl-1,3,4-dioxazole-2-carboxylic acid and 2 - phenethyl-5-phenyl-1,3,4-dioxazole-2-carboxylic acid; 2-(lower alkyl)-5-naphthyl-1,3,4-dioxazole-2-carboxylic acids, such as 2-methyl-5-α-naphthyl-1,3,4-dioxazole-2-carboxylic acid; 2-[monocyclic ar(lower alkyl]-5-naphthyl-1,3,4-dioxazole-2-carboxylic acids, such as 2-benzyl-5-α-naphthyl - 1,3,4 - dioxazole-2-carboxylic acids; and 5-aromatically substituted halo, nitro, hydroxy, amino, trifluoromethyl, lower alkyl, lower alkoxy and lower alkanoylamido derivatives of any of these, such as 2-methyl-5-p-nitrophenyl-1,3,4-dioxazole-2-carboxylic acid, 2-ethyl-5-p-chlorophenyl-1,3,4-dioxazole-2-carboxylic acid, 2-benzyl-5-p-(trifluoromethyl)-phenyl-1,3,4-dioxazole-2-carboxylic acid, 2-methyl-α-(p-chloronaphthyl)-1,3,4-dioxazole-2-carboxylic acid, 2-methyl-5-p-tolyl-1,3,4-dioxazole-2-carboxylic acid, 2-methyl-5-p-methoxyphenyl-1,3,4-dioxazole-2-carboxylic acid, 2-methyl-5-m-ethoxyphenyl-1,3,4-dioxazole-2-carboxylic acid, 2-methyl-5-p-hydroxyphenyl-1,3,4-dioxazole-2-carboxylic acid, 2-methyl - 5 - p - aminophenyl-1,3,4-dioxazole-2-carboxylic acid, and 2-methyl-5-p-acetamidophenyl-1,3,4-dioxazole-2-carboxylic acid; 2-(lower alkyl)-5-heterocyclic-1,3,4-dioxazole-2-carboxylic acids, such as 2-methyl-5-β-furyl-1,3,4-dioxazole-2-carboxylic acid, 2-isopropyl-5-β-thienyl-1,3,4-dioxazole-2-carboxylic acid, and 2-ethyl-5-β- pyridyl-1,3,4-dioxazole-2-carboxylic acid; and 2-[monocyclic ar-(lower alkyl)]-5-heterocyclic-1,3,4-dioxazole-2-carboxylic acids, such as 2-benzyl-5-β-thienyl-1,3,4-dioxazole-2-carboxylic acid.

The compounds initially formed, of the Formula I, wherein B is acetyl, in the form of their salts, can then be converted to the free acid form in the usual manner, as by treatment with a dilute mineral acid, such as hydrochloric acid, in an aqueous medium and extraction of the free acid into an organic solvent, such as ethyl acetate, with subsequent evaporation of the solvent. Moreover, these compounds can be saponified to yield the free alcohols (B is hydrogen) by enzymatic hydrolysis of the esters. This enzymatic hydrolysis is preferably carried out using orange peel acetyl esterase [Jeffery et al., Biochem. J., 81, 591 (1961)] and the resulting alcohol can then be esterified with a different acylating agent, preferably an acid anhydride or acyl chloride of a hydrocarbon carboxylic acid of less than twelve carbon atoms, to yield the other esters of this invention.

The following examples illustrate the invention (all temperatures being in centigrade):

Example 1

2-(2-METHYL-5-PHENYL - 1,3,4 - DIOXAZOLE) CEPHALOSPORIN, SODIUM SALT [FORMULA I, X IS PHENYL, Y IS METHYL, B IS ACETYL]

(a) Preparation of 2-methyl-5-phenyl-1,3,4-dioxazole-2-carboxylic acid: A mixture of 5.0 g. of ethyl 2-methyl-5-phenyl-1,3,4-dioxazole-2-carboxylate, 6 ml. of 40% potassium hydroxide and 7 ml. of alcohol is shaken for two hours. After standing overnight, the mixture is diluted with 10 ml. of water and, after elimination of the separated oil by ether, is acidified to pH 2.5 with dilute hydrochloric acid. The liberated dioxazole-2-carboxylic acid is extracted with ether and is obtained in crystalline form (M.P. 83–85°) by evaporation of the washed and dried ether extract and recrystallization from water.

(b) Preparation of 2-methyl-5-phenyl-1,3,4-dioxazole-2-carboxylic acid chloride: A solution of 2.00 g. of the acid obtained in step (a) in 25 ml. of dry benzene is treated, under efficient cooling, with a solution of 10 ml. of oxalyl chloride in 30 ml. of benzene. One drop of pyridine is added and the mixture stirred until the gas evolution ceases. The excess oxalyl chloride and benzene are then removed by vacuum distillation and the acid chloride obtained is purified by molecular distillation at 80°/0.005 mm. Hg.

(c) Preparation of 2-(2-methyl-5-phenyl-1,3,4-dioxazolyl)cephalosporin, sodium salt: To an ice cold solution of 128.0 mg. of 7-aminocephalosporanic acid and 0.145 ml. of triethylamine in 3 ml. of methylene dichloride (filtered clear after 10 minutes) there is added, dropwise, a solution of 95.0 mg. of the dioxazolecarboxylic acid chloride prepared in step (b) in 1 ml. of methylene dichloride. After one hour at 0°, the mixture is evaporated in vacuo and redissolved in 5 ml. of water. The pH is adjusted to 2.5 and the solution is extracted, first with benzene and then with methyl isobutyl ketone. The latter extract is washed with water, dried over magnesium sulfate, and treated with a solution of sodium ethylhexoate in methyl isobutyl ketone. The sodium salt of methyl-phenyldioxazolylcephalosporin crystallizes.

Example 2

(a) Preparation of 2-methyl-5-phenyl-1,3,4-dioxazole-2-carboxylic acid p-nitrophenyl ester: To a solution of 2.05 g. of 2-methyl-5-phenyl-1,3,4-dioxazole-2-carboxylic acid and 1.67 g. of p-nitrophenol in 30 ml. of ethyl acetate, there is added 2.06 g. of dicyclohexylcarbodiimide. After 2 hours at room temperature, 0.1 ml. of acetic acid is added and the mixture filtered. Evaporation of the filtrate and recrystallization of the residue from ethyl acetate-hexane yields the pure p-nitrophenyl ester, M.P. 86.5–87.5°.

(b) Preparation of 2-(2-methyl-5-phenyl-1,3,4-dioxazolyl)cephalosporin sodium salt: Following the procedure of step (c) of Example 1, but substituting an equivalent amount of the p-nitrophenyl ester of 2-methyl-5-phenyl-1,3,4-dioxazole-2-carboxylic acid for the dioxazole-carboxylic acid chloride, there is obtained the sodium salt of 2-(2-methyl-5-phenyl-1,3,4 - dioxazolyl)cephalosporin.

Example 3

2-(2-METHYL-5-PHENYL-1,3,4-DIOXAZOLYL) CEPHALOSPORIN

A solution of 45.6 mg. of 2-(2-methyl-5-phenyl-1,3,4-dioxazolyl)-cephalosporin, sodium salt in 3 ml. water is acidified to pH 2.2 by addition of normal hydrochloric acid and then thoroughly extracted with ethyl acetate. The combined ethyl acetate extracts are back-washed with water, dried over magnesium sulfate and evaporated to give 2-(2-methyl-5-phenyl-1,3,4-dioxazolyl)cephalosporin (about 35 mg.) as a white solid.

Example 4

2-(2-METHYL-5-PHENYL-1,3,4-DIOXAZOLYL) CEPHALOSPORIN, TRIETHYLAMMONIUM SALT

To a solution of 120 mg. of 7-aminocephalosporanic acid and 0.06 ml. of triethylamine in 2 ml. of dimethyl formamide, there is added 94 mg. of the p-nitrophenyl ester of 2 - methyl-5-phenyl-1,3,4-dioxazol-2-carboxylic acid. After 36 hours at room temperature, 20 ml. of ether is added, whereupon the triethylammonium salt of 2 - (2 - methyl-5-phenyl-1,3,4-dioxazolyl)cephalosporin crystallizes.

Example 5

2-(2-METHYL-5-PHENYL - 1,3,4 - DIOXAZOLYL)-DESACETYL-CEPHALOSPORIN, SODIUM SALT [FORMULA I, X IS PHENYL, Y IS METHYL, B IS HYDROGEN]

To a solution of 2.00 g. of 2-(2-methyl-5-phenyl-1,3,4-dioxazolyl)cephalosporin, sodium salt, in 5 ml. of water, kept at 30°, there is added 10 ml. of orange peel (citrus) acetyl esterase solution [Jeffery et al., Biochem. J., 81, 591 (1961)] and the pH is maintained at 6.6 by automatic addition of N/10 sodium hydroxide solution. After uptake of about 0.9 equivalent of sodium hydroxide, the mixture is freeze-dried to yield the crude 2-(2-methyl-5-phenyl-1,3,4-dioxazolyl)-desacetyl-cephalosporin, sodium salt, which can be further purified by ion exchange chromatography.

Example 6

2-(2-ETHYL - 5 - p - NITROPHENYL-1,3,4-DIOXAZOLYL) CEPHALOSPORIN, SODIUM SALT [FORMULA I, X IS P-NITROPHENYL, Y IS ETHYL, B IS ACETYL]

Following the procedure of Example 1, but substituting an equivalent amount of ethyl 2-ethyl-5-p-nitrophenyl-1,3,4-dioxazole-2-carboxylate for the dioxazole-2-carboxylate in step (a), 2-(2-ethyl-5-p-nitrophenyl-1,3,4-dioxazolyl)cephalosporin, sodium salt is obtained.

Example 7

2-(2-BENZYL-5-α-NAPHTHYL - 1,3,4 - DIOXAZOLYL) CEPHALOSPORIN, SODIUM SALT [FORMULA I, X IS α-NAPHTHYL, Y IS BENZYL, B IS ACETYL]

Following the procedure of Example 1, but substituting an equivalent amount of ethyl 2-benzyl-5-α-naphthyl-1,3,4-dioxazole-2-carboxylate for the dioxazole-2-carboxylate in step (a), 2-(2-benzyl-5-α-naphthyl-1,3,4-dioxazolyl) cephalosporin, sodium salt, is obtained.

Example 8

2-(2-ISOPROPYL - 5 - β - THIENYL - 1,3,4 - DIOXAZOLYL) CEPHALOSPORIN, SODIUM SALT [FORMULA I, X IS β-THIENYL, Y IS ISOPROPYL, B IS ACETYL]

Following the procedure of Example 1, but substituting an equivalent amount of ethyl 2-isopropyl-5-β-thienyl-1,3,4-dioxazole-2-carboxylate for the dioxazole-2-carboxylate in step (a), 2-(2-isopropyl-5-β-thienyl-1,3,4-dioxazolyl) cephalosporin, sodium salt is obtained.

Example 9

2-(2-METHYL-5-PHENYL - 1,3,4 - DIOXAZOLYL)-DESACETYL - PHENYLACETYL - CEPHALOSPORIN, SODIUM SALT [FORMULA I, X IS PHENYL, Y IS METHYL, B IS PHENYLACETYL]

To a suspension of 1.00 g. of 2-(2-methyl-5-phenyl-1,3,4-dioxazolyl)-desacetyl-cephalosporin, sodium salt (Example 5) in 5 ml. of anhydrous dimethyl formamide, there is added 0.04 g. of phenylacetyl chloride and the mixture is stirred for 8 hours at room temperature. Then the mixture is evaporated in high vacuum and the residue after being extracted several times with dry ether, is dissolved in a pH equal 5.0 pyridine-acetate buffer and chromatographed on an Amberlite XE–58 (120–200 mesh, acetate form) column. Elution with pyridine-acetate buffer first yields a lactonic byproduct which is followed by fractions containing the phenylacetylated desacetylcephalosporin. The residue obtained from lyophilisation of the corresponding fractions is redissolved in water. Acidification to pH 2.2, extraction with methyl-isobutyl ketone and treatment of the dried methyl-isobutyl ketone solution with a sodium ethylhexoate solution in methyl isobutyl ketone yields the crystalline sodium salt.

This invention may be variously otherwise embodied within the scope of the appended claims.

What is claimed is:

1. A compound selected from the group consisting of acids of the formula

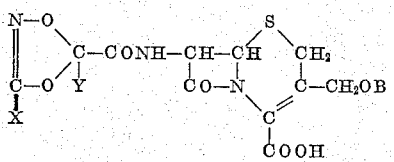

and non-toxic basic salts thereof, wherein B is selected from the group consisting of hydrogen and the acyl radical of a hydrocarbon carboxylic acid of less than twelve carbon atoms; X is selected from the group consisting of phenyl; naphthyl; A-phenyl; A-naphthyl; wherein A is selected from the group consisting of halo, nitro, hydroxy, amino, trifluoromethyl, lower alkyl, lower alkoxy and lower alkanoylamido; furyl; thienyl; pyridyl and piperidyl; and Y is selected from the group consisting of lower alkyl and phenyl-lower alkyl.

2. 2-[2-(lower alkyl)-5-phenyl,1,3,4 - diaxazolyl]cephalosporin.

3. Non-toxic basic salts of 2-[2-(lower alkyl)-5-phenyl-1,3,4-dioxazolyl]cephalosporin.

4. Non-toxic basic salts of 2-(2-methyl-5-phenyl-1,3,4-dioxazolyl)cephalosporin.

5. Non-toxic basic salts of 2-[2-(lower alkyl-5-p-nitrophenyl-1,3,4-dioxazolyl]cephalosporin.

6. Non-toxic basic salts of 2-(2-benzyl-5α-naphthyl-1,3,4-dioxazolyl)cephalosporin.

7. Non-toxic basic salts of 2-[2-(lower alkyl)-5-β-thienyl-1,3,4-dioxazolyl)cephalosporin.

References Cited by the Examiner

UNITED STATES PATENTS 2,941,995  6/60  Doyle et al. _____ 260—239.1

OTHER REFERENCES

Journal American Medical Association, page 466, May 24, 1958.

Morton: The Chemistry of Heterocyclic Compounds, page VI of the preface (1946).

Wertheim: Textbook of Organic Chemistry, pages 763–764 (1945).

NICHOLAS S. RIZZO, *Primary Examiner.*